United States Patent [19]

Pradillon

[11] 4,214,602

[45] Jul. 29, 1980

[54] LIQUID DISTRIBUTOR, NOTABLY FOR SPRINKLING PURPOSES

[75] Inventor: Michel Pradillon, Cluses, France

[73] Assignee: Etablissements Carpano & Pons, Cluses, France

[21] Appl. No.: 911,321

[22] Filed: Jun. 1, 1978

[30] Foreign Application Priority Data

Jun. 6, 1977 [FR] France .................................. 77 17968

[51] Int. Cl.$^2$ ............................................. A01G 27/00
[52] U.S. Cl. ................................. 137/119; 137/624.27; 222/16; 239/68; 239/570
[58] Field of Search ..................... 239/68, 570; 222/16; 137/119, 624.27, 624.13

[56] References Cited

U.S. PATENT DOCUMENTS

| | | | |
|---|---|---|---|
| 2,150,082 | 3/1939 | Sprunger | 222/16 |
| 3,145,736 | 8/1964 | Gheen | 137/624.13 |
| 3,529,618 | 9/1970 | Rinkewich | 239/68 |
| 3,896,854 | 7/1975 | Utchell | 137/624.27 |
| 3,964,685 | 6/1976 | Chauvigné | 239/68 |
| 3,972,344 | 8/1976 | Chauvigné | 137/625.44 |
| 4,022,239 | 5/1977 | Schwindt et al. | 137/119 |
| 4,086,933 | 5/1978 | Pansini | 137/119 |

Primary Examiner—Alan Cohan
Assistant Examiner—H. Jay Speigel
Attorney, Agent, or Firm—Robert E. Burns; Emmanuel J. Lobato; Bruce L. Adams

[57] ABSTRACT

A distributor, notably for use in a sprinkling or like system, for causing a liquid to flow successively through a first orifice, then through a second orifice, but only after a predetermined quantity of liquid has passed through the first orifice. This distributor comprises a volumetric metering device comprising a piston movable in a first direction under the influence of the liquid pressure from the inlet orifice to a first orifice via an open valve, a chamber and a passage. A piston comprises a rod provided with a push member capable of moving a control member in the first direction, this control member being then driven for rotation by a driving member coupled kinematically to a turbine. Simultaneously, the driving body closes the valve and after a predetermined rotation of the control member the cavity thereof registers with the push member and the rod can move freely in the first direction and close the first outlet orifice while opening the second outlet orifice.

24 Claims, 11 Drawing Figures

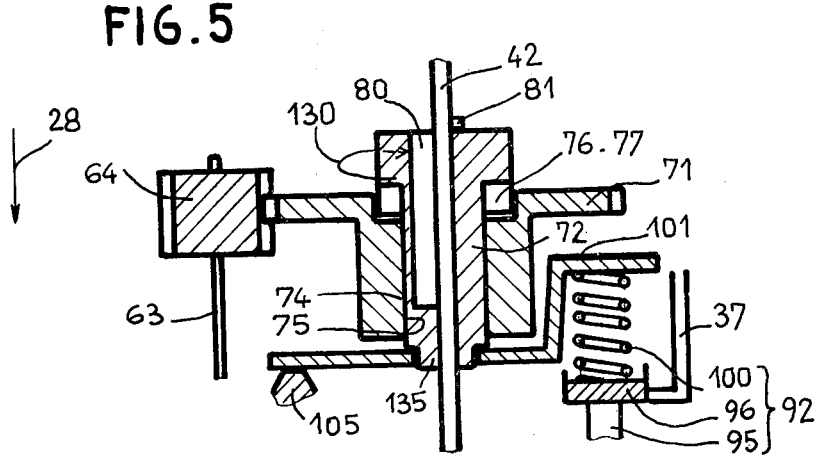
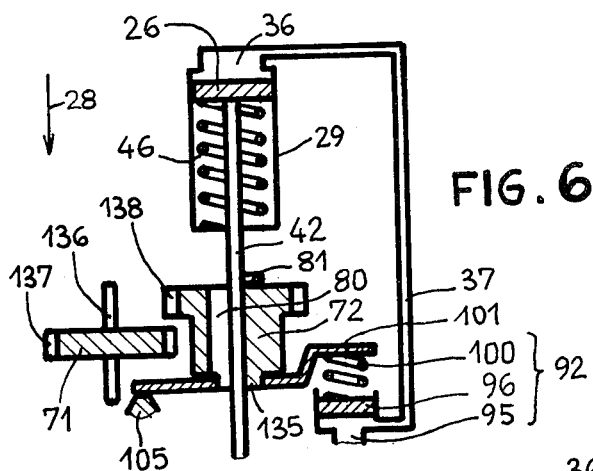
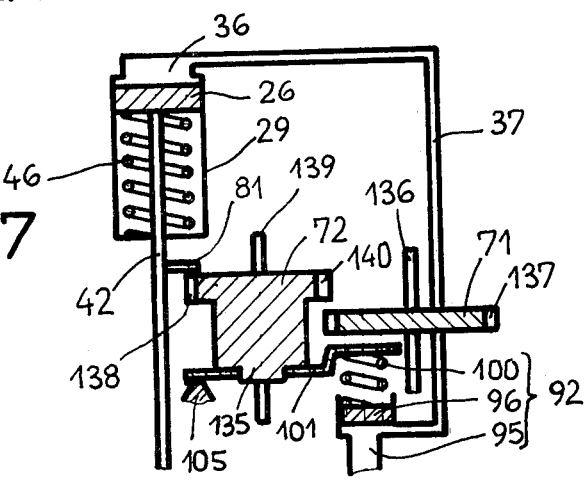

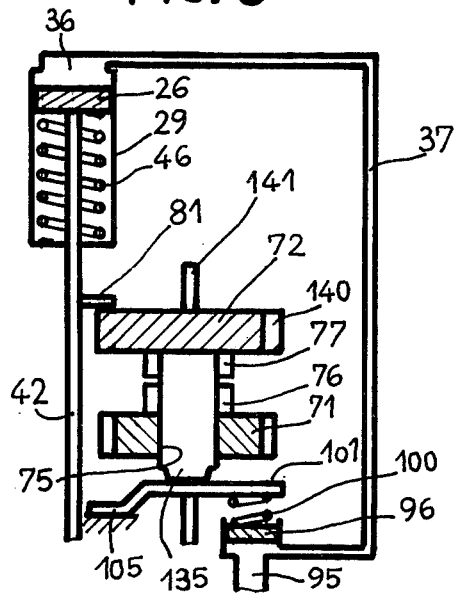
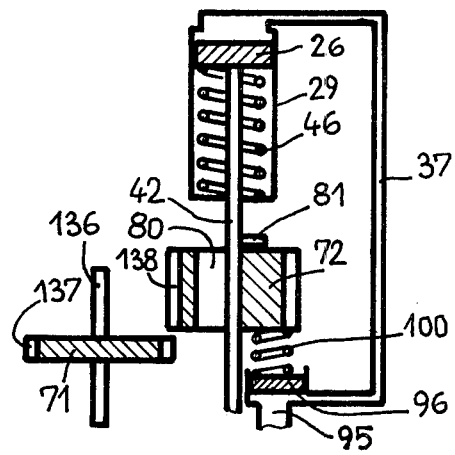
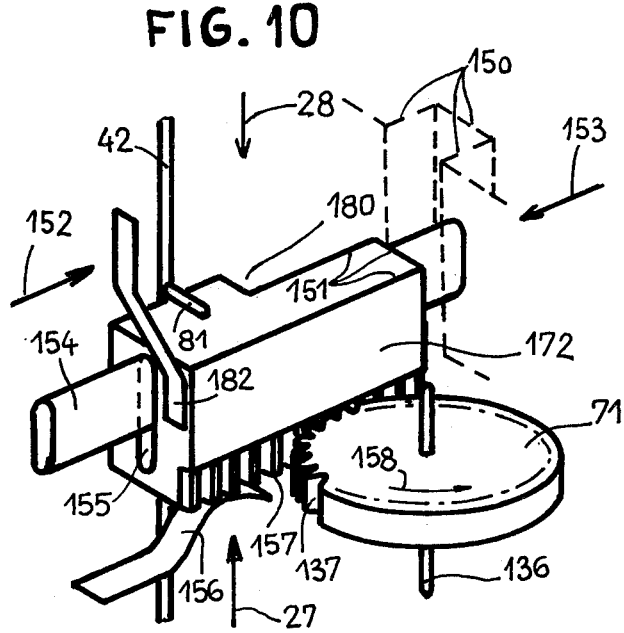

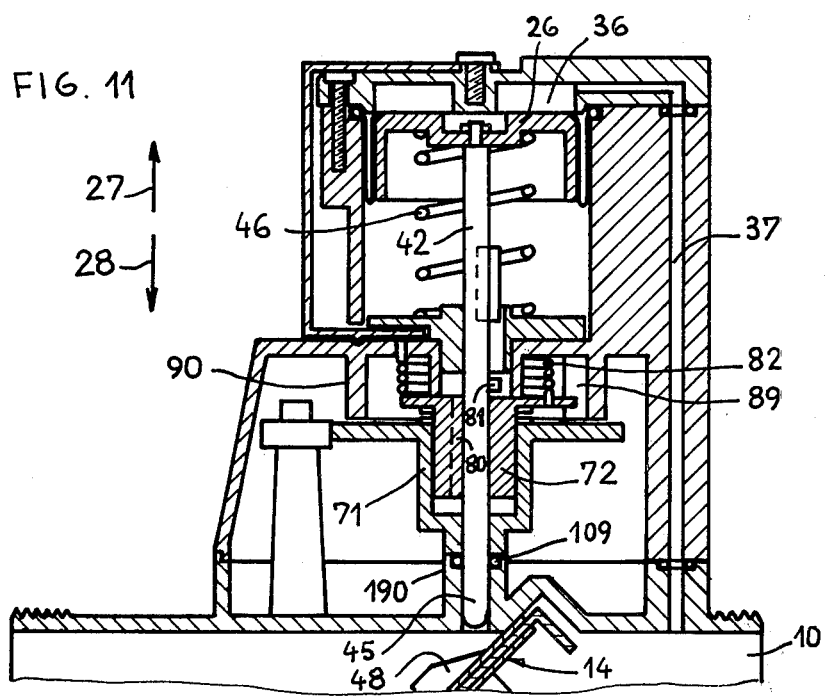

LIQUID DISTRIBUTOR, NOTABLY FOR SPRINKLING PURPOSES

FIELD OF THE INVENTION

The present invention relates in general to distributors of the kind intended for dispensing a liquid, and has specific reference to a volumetric-type distributor notably for watering, sprinkling and spraying systems, of the kind comprising an inlet orifice and two outlet orifices, a valve adapted in the inoperative position in which it is responsive to return means, to close the second outlet orifice while leaving the first outlet orifice open, and a volumetric metering device adapted to actuate said valve against the opposing force of said return means associated therewith for closing said first outlet orifice while opening the second outlet orifice after the passage of a predetermined volume, adjustable or not, of liquid through the first outlet orifice. This volumetric metering device comprises a cylinder provided with a piston of which a first end face defines with the bottom of the cylinder a chamber connected via a passage to said inlet orifice, the opposite end face of said piston supporting a rod having said valve disposed on its path, resilient means constantly urging said piston towards the bottom of said cylinder.

DESCRIPTION OF THE PRIOR ART

In known distributors of this general type, as disclosed notably in the U.S. Pat. No. 3,972,344, the volumetric metering device intended for actuating said valve when a predetermined volume of liquid has passed through the first outlet orifice comprises an output reducing device interposed in the conduit connecting the inlet orifice to the chamber formed between the bottom of the cylinder and the piston. This output reducing device comprising for example a screw adapted to compress more or less and at will an open-cell foam element is extremely sensitive and also acts as a means for controlling the volume of liquid to be dispensed: therefore, efficient filter means must be provided for filtering the liquid flowing through the inlet orifice of the distributor, for it is obvious that the ingress of sand or sludge particles into the output reducing device would impair the proper operation thereof and prevent it from dispensing the desired and predetermined volume of liquid.

SUMMARY OF THE INVENTION

With the distributor according to this invention the above-mentioned inconveniences are safely avoided. In fact, it is the primary object of the present invention to provide a liquid distributor adapted, before opening the second outlet orifice and closing the first outlet orifice, to dispenses through the first outlet orifice a predetermined volume of liquid adjustable or not according to requirements, irrespective of the liquid feed pressure, and without any risk of impairing the operation and possibly the adjustment of the distributor as a consequence of the ingress of sand or sludge particles into the supply circuit. Thus, the safety and reliability of operation of the distributor are greatly improved.

The distributor according to this invention comprises a volumetric metering device provided with a turbine inserted in the liquid circuit between the inlet orifice and the outlet orifice, said turbine being advantageously but not compulsorily disposed between the valve and the first outlet orifice, so that it is rotatably driven only during the period in which the first outlet orifice is open. The volumetric metering device further comprises a drive member coupled kinematically to the turbine via a speed reducer provided with shaped portions adapted to co-act with portions of matching shape provided on a control member adapted to move on the one hand by sliding along a first path on which said control member lies the path of a push-member carried by the rod, and on the other hand along a second path lying in a plane at right angles to said first path when the shaped portions of said control member engage the shaped portions of said drive member. The shaped portions of the two members concerned engage each other after a predetermined sliding movement of the control member along its first path, which movement is caused by said push member. The control member comprises a clearance at least sufficient to permit the passage of said push member, said clearance registering with said push member after a predetermined movement of said control member along its second path as determined by said driving member against the force of resilient means constantly urging said control member against a fixed stop to its inoperative position.

According to a typical embodiment of the invention, the drive member advantageously consists of a rotatably mounted member of which the shaped portions are disposed concentrically to the piston rod. The control member consists of a movable control body mounted for sliding and rotary motion on an axis disposed along its first path, the shaped portions of this control body being disposed concentrically to said axis. The clearance provided to permit the passage of the push member is limited angularly and the movement of the control movable body along its second path, which is a circular path, is limited to less than one revolution. According to a modified embodiment, the drive member also consists of a movable driving body of which the shaped portions are disposed concentrically to the axis. The control member is adapted to slide not only along its first path but also along its second path, its shaped portions being parallel to this second path. The clearance provided for the passage of the push member is limited in the longitudinal direction.

In the specific case of a control movable body mounted for rotary motion, several forms of embodiment may be contemplated. According to a first form of embodiment, the driving member and the control member are both pivoted concentrically to each other about a common axis materialized by a rod supported by the piston. The shaped portions of the two movable bodies are formed on registering faces, respectively, of these bodies. The clearance contemplated in the control body open radially into the orifice provided for the passage of said rod, and the movements of the push member are restricted angularly about said rod. According to another modified embodiment, the control movable body is pivoted to an axis separate from that of the driving body, this axis being materialized by the rod supported by the piston. The shaped portions of the two movable bodies are formed on the outer peripheries of these two bodies, respectively, and resilient means constantly urge them to their disengaged or disconnected relative positions. The clearance and the push member are similar to those of the first modification broadly described hereinabove. According to a further modified embodiment, the axis of the control body, the axis of the driving body and the axis of the piston-supported rod are separate from one another. The shaped portions of the two movable bodies are formed on the outer peripheries of these two bodies, respectively; resilient means constantly urge these two movable bodies to their disengaged positions, respectively. The clearance provided in the control movable body opens radially into the outer periphery of this control movable body. According to another modified embodiment of this invention, the driving movable body and the control movable body are pivoted concentrically to each other about a common axis separate however from that of the piston-supported rod. The shaped portions of the two movable bodies are formed on registering faces, respectively, of these two bodies. The clearance provided in the control movable body opens radially into the outer periphery of this control movable body. As in the preceding form of embodiment, it is unnecessary to limit the push member angularly about the rod supporting this push member.

In the case of a control member slidably movable along each one of its two paths, said control member is advantageously movable along one of its paths on a rectilinear or non-rectilinear relief guide means formed in the control member; this control member is movable along the other path, along a hollow rectilinear or non-rectilinear guide means having a contour corresponding to an external contour of the control member, and disposed transversely with respect to the relief guide means. The dimension of the hollow guide means provided in the control member, in the direction of the other path, is sufficient to permit the movement of said control member along this other path, against the force of resilient means.

All the above-suggested forms of embodiment may advantageously but not compulsorily comprise a second valve member adapted to shut off the passage connecting the cylinder chamber to the inlet orifice as a consequence of the sliding movement of the control member along its first path. Resilient means are disposed between this second valve and the control member, and may consist of the resilient means constantly counteracting the mutual engagement of the corresponding shaped portions of the control and driving members, if such resilient means are contemplated. According to a modified embodiment of this construction comprising a second valve, which is applicable to structures wherein the control movable body and the driving movable body are pivoted concentrically to each other about a common axis, the driving movable body may also be mounted for movement along its axis; one portion of this driving movable body is interposed between the control member and the resilient means co-acting on the other hand with the second valve. According to a further modification, in a structure comprising a second valve, the resilient means disposed between the second valve and the control valve is unstressed in the inoperative position.

In the case of a distributor comprising a second valve, a lever may advantageously be provided to constitute an intermediate member between the resilient means co-acting with said second valve and the control member, respectively the control movable body, respectively the driving movable body, according to cases. According to a modified embodiment of this version, the intermediate lever consists of a spring blade also constituting the resilient means co-acting with the second valve.

Some forms of embodiment of this distributor according to the instant invention comprise means for regulating the volume of liquid allowed to flow through the first outlet orifice before closing this first orifice. If the control member is a movable body rotatably mounted about an axis consisting of the piston-supported rod, said adjustment means will consist of a device enabling the push member to move angularly through one fraction of a revolution, and in this case the push-member movement is of course limited angularly. If desired, the piston-supported rod and therefore the push-member supported thereby may be moved angularly.

The accompanying drawings illustrate diagrammatically by way of example typical forms of embodiment of the distributor according to the present invention. In the drawings:

BRIEF DESCRIPTION OF THE DRAWINGS

FIG. 5 is a fragmentary section similar to FIG. 1 but showing a second form of embodiment of the invention;

FIG. 6 is a diagrammatic illustration of a third form of embodiment of the invention;

FIG. 7 is a diagrammatic illustration of a fourth form of embodiment of the invention;

FIG. 8 is a diagrammatic illustration of a fifth form of embodiment of the invention;

FIG. 9 illustrates diagrammatically a sixth form of embodiment of the invention;

FIG. 10 is a perspective view of a seventh form of embodiment of the invention; and FIG. 11 is a fragmentary section showing in a manner similar to FIG. 1 an eighth form of embodiment according to the invention.

DESCRIPTION OF THE PREFERRED EMBODIMENTS

Figure 1:
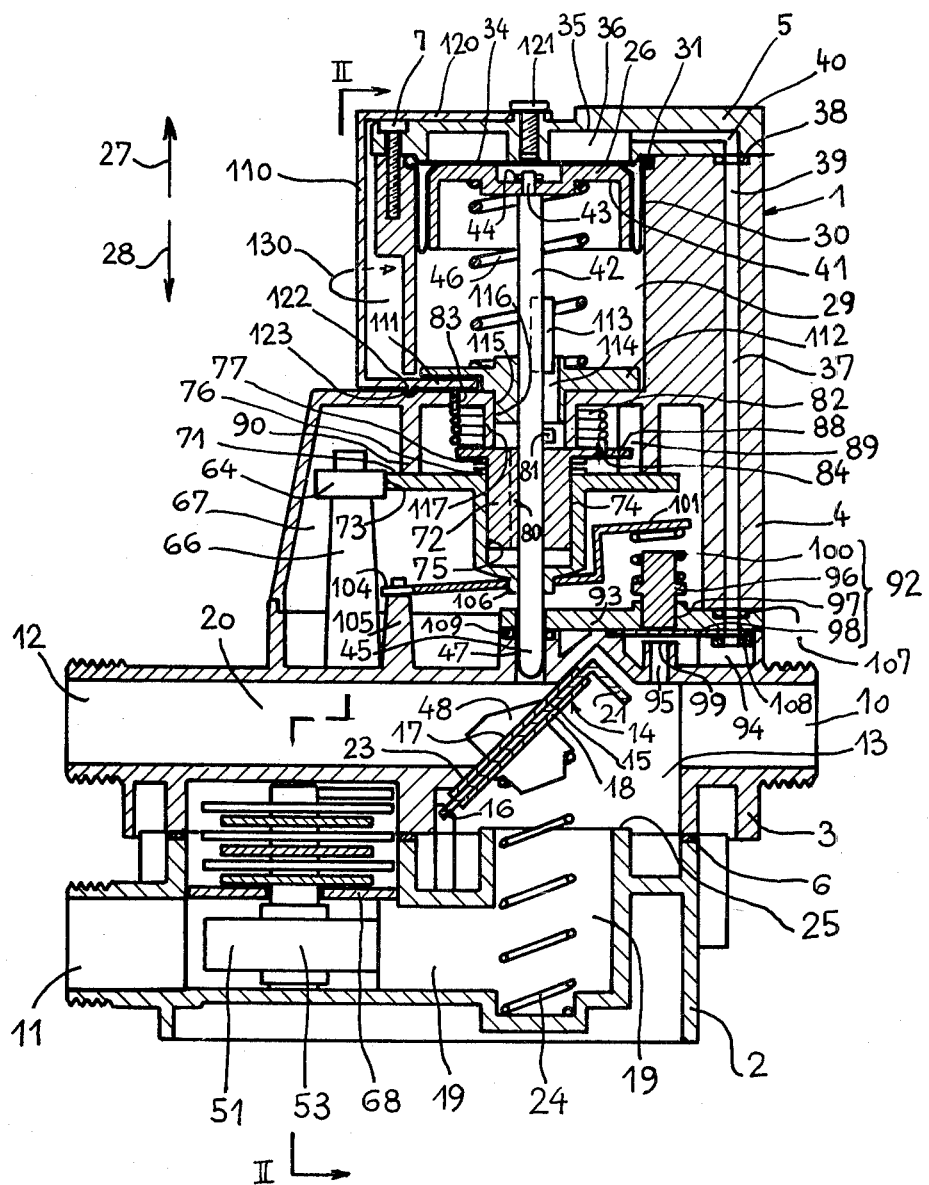
FIG. 1 is a section taken along the line I—I of FIG. 2, showing a first form of embodiment of the invention in the inoperative position.
Figure 2:
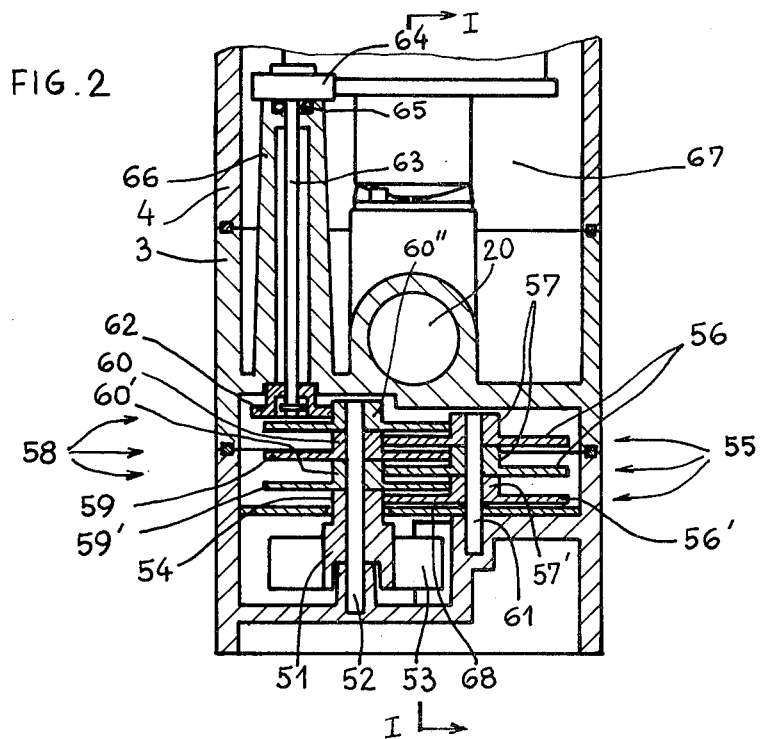
FIG. 2 is a fragmentary section taken along the line II—II of FIG. 1, showing the same form of embodiment.

As illustrated in FIGS. 1 to 4 of the drawings, the fluid distributor according to this invention comprises a casing 1 made of three sections 2,3 and 4, and of a cover 5. Between sections 2 and 3 a gasket 6 is inserted. The sections 2,3 and 4 are assembly by means of screws (not shown). The cover 5 is secured by other screws 7. The casing 1 thus constructed comprises an inlet orifice or port 10, a first outlet orifice or port 11 and a second outlet orifice or port 12. The inlet orifice 10 opens internally into a chamber 13 having dimensions sufficient to house a first valve member 14 consisting of a disc 15 hingedly mounted, with play, to a pivot pin 16 disposed at one end thereof. This disc 15 comprises on either face a lining 17, 18 of sealing material. The chamber 13 is connected via an elbow-shaped passage 19 to the first outlet orifice 11 and via a substantially rectilinear passage 20 to the second outlet orifice 12. In the inoperative position the first valve 14 is constantly urged against a first corresponding seat 23 by return means consisting for example of a coil compression spring 24 advantageously housed in the elbow 19. It may be appreciated that if the device of FIG. 1 were disposed upside down, i.e. with the cover 5 at the bottom, the first valve 14 could be urged to its seated position simply by gravity. The first valve seat 23 is advantageously inclined, by about 45° in the present example, with respect to the inlet orifice 10, towards said inlet orifice (FIG. 1). The valve disc 15 may advantageously comprise a bent extension 21, forming an angle of about 90° with the main disc surface, towards both the inlet orifice 10 and a second seat 25. This second seat 25 is also adapted to co-act with the opposite face of valve 14 when the return spring 24 is compressed. This second seat 25 lies approximately in a plane tangent to the inlet orifice 10 and to the passage 20.

A volumetric metering device is provided for actuating the valve 14. It comprises a cylinder 29 provided with a piston 26 adapted to move in one or the other direction shown by the arrows 27 and 28. A membrane 30 seals the joint between the piston and the cylinder wall; an upper bead 31 pertaining to this membrane 30 also seals the joint between the casing section 4 and the cover 5. A first face 34 of piston 26 defines in conjunction with the bottom 35 of cylinder 29 a chamber 36 connected to the inlet orifice 10, or more particularly in this example to one portion of chamber 13 which is close to this inlet orifice 10, via a conduit or passage 37. A gasket 38 seals the joint between the two sections 39 and 40 of this passage 37 which are formed in the section 4 of housing 1 and in the cover 5. The piston 26 is provided on its inner face 41 opposite the first face 34 with a rod 42 which, in this example, is cylindrical and parallel to the cylinder 29. This rod 42 comprises a portion 43 of reduced diameter which is pivotally mounted in the piston 26, a circlip 44 preventing the axial movement of the rod in relation to the piston 26. The rod end 46 opposite said reduced portion 43 has external dimensions such that it can slide freely in guide means 47 of matching contour formed in section 3 of casing 1. A helical compression spring 46 engages the second face 41 of piston 26 and constantly urges the latter in the direction 27, i.e. towards the bottm 35 of cylinder 29. The disc 15 of valve 14 is disposed on the path of the permissible axial movement of rod 42, the end 45 of said rod 42 being adapted to engage a suitably shaped projection 48 formed on the disc 15 and aligned with said rod end 45. The spring 24 is coaxial with the rod 42.

The volumetric metering device further comprises a turbine 51 pivoted to a shaft 52. The blades 53 of this turbine 51 lie on the path of the liquid flowing through the elbow 19 from the inlet orifice 10 and the first outlet orifice 11. In this exemplary form of embodiment the turbine 51 extends between the valve 14 and the first outlet orifice 11: therefore, it rotates only when the valve 14 does not engage its second seat 25. However, it would not constitute a departure from the basic principle of the present invention to dispose the turbine 51 between the inlet orifice 10 and the valve 14, but in this case the turbine would rotate continuously. The turbine 51 is rigid with a pinion 54 meshing with a speed reducer shown more particularly in FIG. 2 and comprising movable elements 55 comprising each a toothed wheel 56 and a toothed pinion 57, and other movable elements 58 comprising each a toothed wheel 59 and a toothed pinion 60. These elements 58 are pivoted to the shaft 52 of turbine 51, and the movable assembly 55 is pivoted to a shaft 61 parallel to shaft 52. The toothed pinion 54 is in constant meshing engagement with the toothed wheel 56' of the first movable assembly 55, of which the toothed pinion 57' is in constant meshing engagement with the toothed wheel 59' of the movable assembly 58 of which the toothed pinion 60' is in constant meshing engagement with the next movable assembly 55, and so forth. The last toothed pinion 60'' is in constant meshing engagement with a toothed wheel 62 rigid with one end of a countershaft 63 of which the opposite end carries a toothed wheel 64 rigid therewith. An O-ring 65 fits around the shaft 63 and is housed in an annular cavity formed in an inner projection 66 of casing section 3 for sealing the joint between the liquid-filled chamber in which the speed reducer is enclosed and another chamber 67. A detachable partition 68 separates the speed reducer from the turbine 51 to prevent the liquid flow driving said turbine 51 from circulating around the speed reducer.

The above-mentioned other chamber 67 contains most of the other component elements of the volumetric metering device. These other component elements comprise notably a driving body 71 and a control body 72. The driving body 71 has gear teeth 73 formed on its outer periphery which are in constant meshing engagement with the toothed wheel 64. It comprises an axial internal cylindrical recess 74 enabling this body 71 to pivot and slide on an outer cylindrical portion 75 of the control body 72. The latter is pivoted on the rod 42 on which it can also slide axially. The two movable bodies 71 and 72 comprise shaped portions 76 and 77, respectively, having conjugate contours, registering with each other and formed on opposite surfaces of said bodies. These conjugate shaped portions 76 and 77 are disposed concentrically with respect to the rod 42 and consist in this example of teeth having inclined side faces. The control body comprises a clearance or axial cavity 80 (see FIG. 4) opening radially into the orifice provided for receiving the rod 42. This clearance 80 extends parallel to said rod 42 and its dimensions are just sufficient to permit the free passage of a push member 81 rigid with rod 42 and adapted to move through a limited angle about this rod 42; this push member 81 may consist for example of the end portion of a pin force fitted in a transverse hole formed in the rod 42. A spiral spring 82 is disposed concentrically to the rod 42 and has two bent end portions disposed the one (83) in an orifice provided for this purpose in section 4 of housing 1 and the other (84) in another orifice formed in the control movable body 72. This spiral spring 82 thus constantly urges the control body 72 to an inoperative angular position in which one portion 88 of the outer periphery of the control body engages a fixed stop 89. The permissible angular movement of the control body 72 is thus limited to slightly less than one revolution. The fixed stop 89 is rigid with a cylindrical wall 90 surrounding the spiral spring 82 and the control body 72, this wall 90 acting as a stop to the driving body 71 for limiting the axial movement thereof in the direction of the arrow 27.

The volumetric metering device further comprises a second valve means 92 supported by a plate 93 extending between sections 3 and 4 of casing 1. This plate 93 separates the chamber 67 enclosed in section 4 of casing 1 from a chamber 94 incorporated in section 3 of said casing 1. The passage 37 extends through said plate 93 before opening into this chamber 94 connected to chamber 13 and consequently to the inlet orifice 10 via a portion 95 of said passage 37. The second valve means 92 comprises a sliding push member 96 movable in direction 27 or 28 through an orifice 97 formed in said plate 93. This push member 96 is adapted to push the central portion of a membrance 98 disposed between said plate 93 and said chamber 94 for causing said membrane 98 to engage a seat 99 provided at one end of passage 95, under the force of a coil compression spring 100. This spring 100 is adapted to react with one end against the push member 96 and with the opposite end against one end of a lever 101 pivoted at 104 to an inner boss 105 of casing 1. The intermediate portion of lever 101 co-acts with one portion 106 of the driving movable body 71 disposed at the opposite end of the inner cavity 74. This portion 106 is thus interposed between the control movable body 72 and the lever 101. The fluid-tightness of the passage 37 is obtained through the plate 93 and a gasket 107. The fluid-tightness between the plate 93 and the section 3 of casing 1 is obtained by the peripheral portion of membrane 98, a washer 108 pressing said membrane 98 against the adajacent end of passage 37. Another seal 109 is provided between the end 45 of rod 42 and the corresponding guide end 47, and also between the plate 93 and the section 3 of casing 1.

The volumetric metering device of this example comprises adjustment means consisting of elements allowing the angular displacement through one fraction of a revolution, at will, of the piston rod 42 having its end 43 rotatably mounted in the piston 26. The angular position of push member 81, and consequently its angular position in relation to the clearance 80, may thus be modified. This device comprises a control lever 110 of which a first end 111 extend across the rod 42 and is rigid with a sleeve 112 surrounding said rod 42. The rod 42 and sleeve 112 are adapted to slide in the axial direction in relation to each other but prevented from rotating in relation to each other by a longitudinal key 113 carried by the rod 42 and constantly engaging a longitudinal groove 114 formed in said sleeve 112. The key 113 extends on the same generatrix of rod 42 as push member 81, and these two members have the same width. The external cylindrical portion 115 of sleeve 112 engages a matching cylindrical cavity 116 formed in a cylindrical boss 117 formed integrally with the casing section 4. In this example, the boss 117 is substantially surrounded by and concentric with the spiral spring 82. The control lever 110 is substantially U-shaped and comprises a second end 120 parallel to the first end 111 which is pivoted to an internal boss formed integrally with the cover 5; this second end 120 is held by a screw 121 on the cover 5. The lower portion (FIG. 1) of the first end 111 of lever 110 comprises a part-spherical bulged portion 122 engaging one of a plurality of matching recesses 123 formed in the registering surface of the section 4 of casing 1. These recesses 123 are disposed concentrically to the rod 42. The spring 46 which, as described herinabove, reacts with one end against the other face 41 of piston 26, reacts with its opposite end against the sleeve 112, whereby the bulged portion 122 is constantly urged for engagement with the recess 123 brought manually in registration therewith. Thus, rotating the lever 110 manually may cause the bulged portion 122 to come out from the previously selected recess 123 for engaging another recess 123 of the series.

Figure 3:
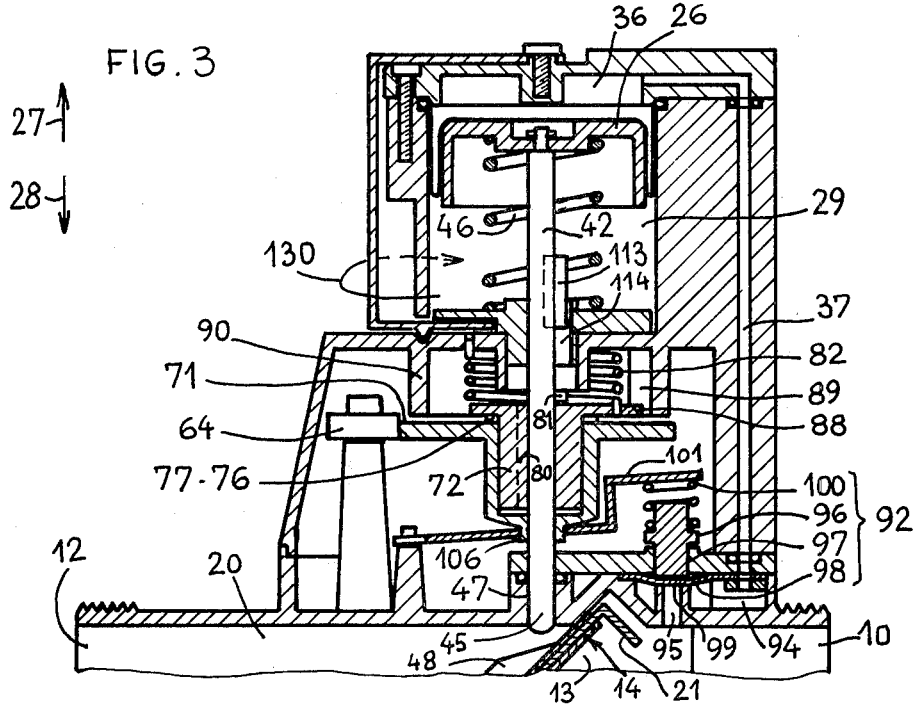
FIG. 3 illustrates in fragmentary section taken along the same line as FIG. 1 the first form of embodiment in an intermediate position.
Figure 4:
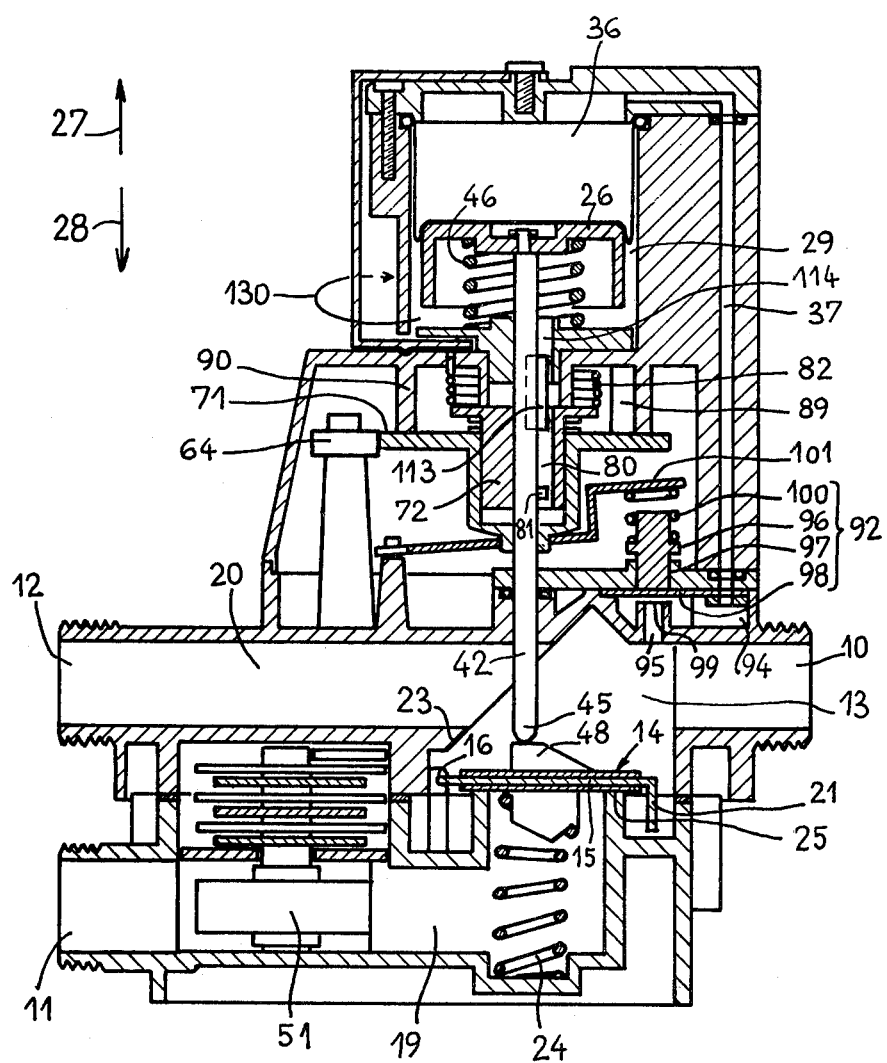
FIG. 4 illustrates in section taken along the line I—I of FIG. 2 the same first form of embodiment in a position such that the first outlet orifice is closed.

A scale (not shown in the drawings) is advantageously provided on the cover 5, concentrically to the screw 121 and registering with the second end 120 of control lever 110, so as to co-act with this lever for displaying the angular position of the first end 111 of said control level. In FIG. 1, the distributor is shown in its inoperative position in which no liquid under pressure is supplied to the inlet orifice 10. In this inoperative position the valve 14 engages its seat 23 and thus shuts off the passage 20 leading to the second outlet orifice 12. The inlet orifice 10 is thus connected freely via the passage 19 to the first outlet orifice 11. The turbine 51 and its speed reducer are stationary, like the driving movable body 71. On the other hand, the piston 26 and its rod 42, urged by spring 46, are in their end position in the direction of the arrow 27, so that the volume of chamber 36 has its minimal value. The spiral spring 82 keeps the extension 88 of the control movable body 72 in engagement with the stop member 89. The driving movable body 71 is moved home in the direction 27 so as to engage the end of boss 90, and kept in this position by the lever 101 urged in turn by the spring 100 of the second valve 92 now unseated. The spring 100 is substantially completely unstressed. The teeth 77 of the control movable body 72 are not in meshing engagement with the teeth 76 of the driving movable body 71. The push member 81 is disengaged in the direction 27 from the clearance 80 of control movable body 72 and shifted angularly in relation to said clearance 80. In FIGS. 3 and 4, only the reference numerals necessary for a proper understanding of the mode of operation of the distributor are provided, all the other reference numerals being the same as in FIG. 1.

When a liquid under pressure is fed to the inlet orifice 10 and flows into the chamber 13, it penetrates immediately into the section 95 of passage 37, into chamber 94, into the other section of passage 37 and finally into the chamber 36 of cylinder 29. Due to the liquid pressure, the piston 26 and its rod 42 are moved in the direction of the arrow 28 against the force of spring 46, so that push member 81 engages the control movable body 72 of which the teeth engage the registering teeth 76 of the driving movable body 71. Thus, it moves the movable control body 72 in the direction 28 along a first, rectilinear path, and thus the driving movable body 71 is also moved. The latter, through its end portion 106, moves in turn the lever 101 back so that the end of this lever moves the push member 96 and the membrane 98 in the direction 28, against the force resulting from the fluid pressure exerted against the opposite face of said membrane in chamber 94. While the membrane 98 tightly engages the seat 99, the spring 100 is compressed to counter-balance this liquid pressure. Thus, valve 92 is closed and immediately the liquid pressure exerted against the walls of passage 37 and chamber 36 decreases suddenly, thus causing a very slight additional movement of piston 26, as well as a very slight additional compression of spring 100. Thus, piston 26 and its rod 42 are held against axial movement, this also applying to the control movable body 72, the driving movable body 71 and the lever 101. Consequently, valve 92 remains seated. Meanwhile, the end 45 of rod 42 is moved towards the shaped projection 48 of valve 14 and stopped in close vicinity thereof. At that time, the various component elements of the distributor are substantially in the position shown in FIG. 3, with valve 14 still shutting off the passage 20 and the second outlet orifice 12. The liquid can flow freely through the elbow 19 and the first outlet orifice 11.

Immediately as the liquid flows through the elbow 19, the turbine 51 is driven thereby at a relatively high speed and thus causes via the movable assemblies 55 and 58 the rotation of its speed reducer (FIG. 2), the transmission rod 63 and the toothed wheel 64. The latter drives at a slow speed the driving movable body 71, for example as shown by the arrow 130. The driving movable body 71 thus causes through its teeth 76 the rotation, in the same direction, of the control movable body 72. Consequently, the control movable body 72 moves away from its stop 89 and rotates slowly in the direction of the arrow 130 against the force of the spiral spring 82. Thus, during the complete time period in which the liquid flows through the elbow 19, the turbine 51 rotates at high speed and the control movable body 72 continues to rotate slowly along a second circular path.

When a predetermined amount of liquid has passed through the first outlet orifice 11, i.e. after the rotation of the control movable body 72 through a predetermined angle, the clearance 80 of this control movable body registers with the push member 81 and the latter can thus penetrate into said clearance 80. Immediately, due to the force of spring 100 thus allowed to expand freely, the lever 101 moves the driving body 71 and also the control body 72 in the direction 27. The driving body 71 resumes its position of bearing engagement with the boss 90. At the same time, sine the spring 100 is expanded, the liquid pressure in chambre 13 can move the membrane 98 in the direction 27 and thus the valve 92 is open, thus allowing the liquid to flow freely in passage 37 and chamber 36 of cylinder 29. The piston 26 and its rod 42 move freely and rapidly in the direction 28, while the push member 81 slides in clearance 80 and key 113 slides in groove 114 and subsequently in clearance 80. The end portion 45 of rod 42 moves the bearing portion 48 of valve disc 15 in the direction 28 and thus the valve is moved towards its other seat 25 against the force of spring 24 and also of the liquid pressure in chamber 13. When the disc 15 is unseated from its first seat 23, the liquid from the inlet orifice 10 exerts a pressure against the bent extension 21, thus causing the sudden movement of the valve disc 15 towards and against the other seat 25. Thus, the passage of elbow 19 is closed, and since the liquid does not flow through the first outlet orifice 11 the turbine 51 is not rotated by the liquid stream, and the driving movable body 71 becomes stationary.

At the same time, the liquid flows freely through the passage 20 and the second outlet orifice 12. The various component elements of the distributor are then in the position illustrated in FIG. 4 and maintained in this position as long as liquid under pressure is fed through the inlet orifice 10. When the liquid has circulated during a predetermined time period, as determined by the user, through the second outlet orifice 12, the supply of liquid under pressure to the inlet orifice 10 is discontinued, and the pressure in the inlet passage, therefore in the inlet orifice 10 and chamber 36 of cylinder 29, is eliminated, for example by providing a draining orifice. The spring 46 can thus move the piston 26 and its rod 42 in the direction of the arrow 27, so that the rod 42 releases the valve disc 15 which, urged by its companion spring 24, re-engages its first seat 23. The first outlet orifice 11 is thus open and the second outlet orifice 12 is shut off. At the same time, the push member 81 comes out from the clearance 80 and the control movable body 72, responsive to the spiral spring 82, is rotated in the direction opposite to 130, its teeth 77 formed with inclined side faces reacting on the teeth 76 of the driving movable body 71 so as to be disconnected therefrom; consequently, the movable control body 72 will move during a first period in the direction of the arrow 27 and, in a second period, in the direction opposite to 130 to resume its position of engagement with the fixed stop 89. Now all the component elements of the distributor resume the position shown in FIG. 1 and the assembly is ready for another cycle of operation.

From the foregoing it is clear that with this distributor it is possible to actuate a valve member for closing a first outlet orifice while opening a second outlet orifice, after the passage of a predetermined volume of liquid through the first outlet orifice. This desired and predetermined volume of liquid can be preset by simply rotating the control lever 110 until its reference mark registers with the proper line of the scale carried by the casing 1. Thus, for example, if the lever 110 is moved in the direction of the arrow 130 (FIG. 1), the sleeve 112, rod 42 (via its key 113) and finally push member 81 are rotated in the same direction. The relative angular position of this push member 81, with respect to the clearance 80, is thus modified; in the present example, the control movable body and its clearance 80 must perform a greater angular movement before this clearance registers with the push member 81; the time during which the valve 14 allows the liquid to flow through the first outlet orifice 11 is thus extended and a larger volume of liquid is dispensed. Conversely, if the lever 110 were actuated in the direction opposite to 130, the predetermined volume of liquid would be reduced. It will be seen that the lever 110 can easily be set to cause the clearance 80 to be aligned with the push member 81 in the inoperative position. The volume of liquid allowed to flow through the first outlet orifice 11 will thus be nearly zero.

In FIGS. 5 to 10 of the drawings different forms of embodiment of the distributor according to the present invention are illustrated, the same or similar component elements of the distributor of the first form of embodiment being designated by the same reference numerals, even if the shape of these elements differs slightly.

In the second form of embodiment shown only diagrammatically and in fragmentary vertical sectional view in FIG. 5, it is not, as in FIGS. 1 to 4, one portion 106 of the movable driving body 71 that is operatively connected to the lever 101, but a portion 135 of the control movable body 72. The movable driving body 71 further comprises an axial cylindrical inner cavity 74 in which one external cylindrical portion 75 of the movable control body 72 is adapted to pivot and slide, but the driving movable body 71 proper is axially fixed and can only rotate. All the other component elements are identical with those of the first form of embodiment (FIGS. 1 to 4). The assembly shown in FIG. 5 operates substantially like the one constituting the first form of embodiment. FIG. 5 illustrates the various component elements in the positions obtained after the control movable body 72 has been moved along its first path, i.e. in the direction of the arrow 28: the shaped portions 76,77 are in mutual meshing engagement, and the second valve member 92 is closed, and the control movable body 72 is rotating along its second path, which is a circular path, as shown by the arrow 130.

In the third form of embodiment, illustrated only diagrammatically and in fragmentary section in FIG. 6, the control movable body 72 is also pivoted to the rod 42 but the movable driving body 71 is pivoted about another shaft 136 parallel to rod 42. The driving body 71 is movable only for rotation about the axis of its shaft 136. The movable driving body 71 is also operatively connected through its portion 135 (as in the form of embodiment shown in FIG. 5) to the lever 101. The shaped portions 76 and 77 of the driving movable body 71 and of the control movable body 72 (FIGS. 1 to 4) are replaced by shaped portions 137 and 138, respectively, formed on the outer peripheries of these two movable bodies. The shaped portions 138 engage the shaped portion 137 upon completion of a predetermined axial movement of the control movable body 72 along its first (rectilinear) path, i.e. in the direction of the arrow 28, against the force of spring 100. All the other component elements are identical with those of the first form of embodiment. This assembly operates substantially like the first form of embodiment. FIG. 6 shows the various component elements in the inoperative position; the control movable body 72 being shown before starting its movement along its first path, in the direction of the arrow 28. Its shaped portions 138 are not yet in engagement with the shaped portions 137 of the movable driving body 71. The second valve member 92 is open.

In the fourth form of embodiment illustrated also diagrammatically and in fragmentary section in FIG. 7, not only the driving movable body 71 is pivoted to a shaft 136 but also the control movable body 72 is pivoted to a shaft 139 separate from the rod 42 and shaft 136. As in the third form of embodiment (FIG. 6), the driving movable body 71 is movable only for rotation about its shaft 136, the control movable body 72 being movable on its shaft 139 on the one hand along an axial path parallel to said shaft 193 and on the other hand when the peripheral shaped portions 138 are caused, against the force of spring 100, to engage the matching shaped portions 137 of the driving movable body 71 along the second path which is a circular path. One portion 135 of the movable control body 72 is still in engagement with the lever 101. The clearance 80 of the preceding form of embodiment is replaced by a clearance 140 opening radially into the outer periphery of this movable control body; it will be seem that this modified clearance 80 is deeper than the shaped portions 138, so that the push member 81 can penetrate only into the clearance 140. All the other component elements of this version are identical with those of the first form of embodiment (FIGS. 1 to 4). The distributor of FIG. 7 operates substantially like the distributors of the preceding forms of embodiments. FIG. 7 shows the various component elements of the distributor in their inoperative position, which is similar to that of FIG. 6.

In the fifth form of embodiment illustrated diagrammatically and in fragmentary section in FIG. 8, the driving movable body 71 and the control movable body 72 are pivoted concentrically to each other about a common shaft 141 separate from, but substantially parallel to, the piston rod 42, in this example. As in the fourth form of embodiment (FIG. 7), the control movable body 72 comprises a clearance 140 disposed on its outer periphery and adapted to cooperate with the push member 81. As in the second form of embodiment shown in FIG. 5, one portion 135 of the control movable body 72 actuates the lever 101, the driving movable body 71 which is axially fixed being pivoted about a portion 75 of the control movable body 72. All the other component elements are similar to those of the first form of embodiment (FIG. 1). As in the cases illustrated in FIGS. 6 and 7, the various component elements are shown in an inoperative position.

In the sixth form of embodiment illustrated diagrammatically and in fragmentary section in FIG. 9, the lever 101 disposed as an intermediate element between the spring 100 and the movable control body 72, is dispensed with, and this spring 100 engages directly the control movable body 72. All the other component elements are similar to those of the third form of embodiment (FIG. 6). The assembly operates like the one constituting the third form of embodiment (FIG. 6). In FIG. 9, the various component elements are shown in their inoperative position.

It will be noted that in all the other forms of embodiment disclosed hereinabove (FIGS. 1 to 8) the lever 101 can be dispensed with, as in the case illustrated in FIG. 9, the spring 100 acting directly upon the control movable body 72 (FIGS. 5 to 8) or through the medium of one portion 106 of the driving movable body 71 which, in this case, is mounted for sliding movement (FIGS. 1 to 4).

Similarly, in all the form of embodiment illustrated in FIGS. 1 to 8, the lever 101 may be replaced by a lever consisting of a spring blade substituted in turn for the spring 100 associated with the second valve member.

Likewise, in all the forms of embodiment illustrated in FIGS. 5 to 9 the spring 100 of the second valve member 92 is also utilized for counteracting the mutual coupling of the relevant shaped portions 76-137 and 77-138 of the control and driving movable bodies 72 and 71. Alternatively, this lastmentioned function may be accomplished by some resilient means separate from the spring 100 of the second valve member. This is illustrated in the modified version of FIG. 10.

In the seventh form of embodiment illustrated diagrammatically and in perspective view in FIG. 10, the driving movable body 71 is pivoted to a shaft 136 as in the embodiment of FIGS. 6, 7 and 9, and this body 71 cannot move in the axial direction along shaft 136. Its shaped portons 137 are disposed concentrically to shaft 136 on the outer periphery of said driving movable body 71. The control body 72 of the preceding forms of embodiment is replaced by a control member 172 adapted to move along a first path in direction 27 or 28, by sliding along a hollow guide portion 150 which, in this example, is rectilinear, this guide portion corresponding to an external contour 151 of said control body 172. The latter is also movable along a second path, in either direction 152 or 153, along a rail or like relief guide member 154 extending at right angles to the hollow guide portion 150 and adapted to co-act with a hollow guide portion 155 of conjugate contour formed in the control body 172. The dimensions of this hollow guide portion 155, in the direction of the first path of control body 172, are sufficient to permit the movement of this control body 172 along this first path in the direction 28, against the force of resilient means consisting in this example of a spring blade 156. The spiral spring 82 of the preceding forms of embodiment is replaced by another spring blade 182 constantly urging the control body 172 in the direction 152 in order to press same into the hollow guide portion 150. This control body 172 also comprises shaped portions 157 adapted to co-act with matching shaped portions 137 of the driving movable body 71 parallel to its second path 152,153. It comprises a clearance 180 substituted for the clearance 80 of the preceding forms of embodiment. This clearance 180 is bounded in the longitudinal direction and disposed along the same second direction. As in the other forms of embodiment illustrated in FIGS. 1 to 8, the control body 172 co-acts with a lever 101 operatively connected to a valve 92 (not shown in FIG. 10). All the other component elements are identical with those of the first form of embodiment (FIGS. 1 to 4).

When the piston rod 42 is moved in the direction of the arrow 28, as in the preceding forms of embodiment, its push member 81 causes the control body 172 to move along its first path, in the direction of the arrow 28, in the hollow guide portion 150, against the force of spring blade 156, until the shaped portions 157 are in meshing engagement with the shaped portions 137 (FIG. 10). This movement is allowed by the transverse dimensions of the hollow guide means 155 disposed at right angles to said hollow guide portion 150. The rotation, in the direction of the arrow 158, of the driving movable body 71 is thus attended by the slow movement of the control body 172 along its second path in the direction of the arrow 153, along the relief guide means 154, against the force of the spring blade 182.

When the predetermined volume of liquid has passed through the first outlet orifice 10, the push member 81 registers with the clearance 180; the rod 42 is thus free to move swiftly in the direction 28 for actuating the valve 14, so as to close the first outlet orifice 11. At the same time, the control body 172 is moved suddenly in the direction 27 by the force of spring blade 156. At the end of the cycle, when the liquid pressure is discontinued in the distributor, the rod 42 moves in the direction 27, and the push member 81 releases the control body 172 which can thus move in the direction 152 under the force of spring blade 182. Thus, the various component elements of the distributor resume their inoperative position.

In the above-described forms of embodiment, notably in the first one (FIGS. 1 to 4), the additional compression of spring 100, which takes place when the second valve 92 is closed, is such that the liquid pressure in passage 37 and chamber 36 can be reduced considerably, thus reducing the frictional efforts between the push member 81 and the control movable body 72, and between the driving movable body 71 and the lever 101. It would not constitute a departure from the basic principles of the present invention to simplify the forms of embodiment described in the foregoing, provided that a sufficiently strong structure is provided for mounting and supporting the component elements subjected to considerable strain, and that the turbine 51 has a torque sufficient to overcome the frictional resistances.

FIG. 11 illustrates by way of example this simplified form of embodiment which, in this case, is quite close to the first form of embodiment of FIGS. 1 to 4. The simplification consists essentially in this case in dispensing with the second valve 92. Thus, the spring 100 may also be dispensed with, together with the lever 101. The driving movable body 71 is axially fixed and bears directly against a boss 190 enclosing the seal 109. A slight clearance is provided between the driving movable body 71 and the boss 90. The plate 93 supporting the valve elements 92 in the form of embodiment of FIGS. 1 to 4 may also be dispenses with. All the other component elements, though not designated in FIG. 11 by the corresponding reference numerals, are identical with those of the first form of embodiment (FIGS. 1 to 4).

This assembly operates like the one of the first form of embodiment. The essential difference lies in the fact that since the passage 37 causes the inlet orifice 10 to communicate permanently with chamber 36, this passage 37 and the walls of this chamber 36 are constantly exposed to a pressure equal to that of the liquid in the inlet orifice 10. As a result, the frictional efforts produced between the push member 81 and the control movable body 72 and between the driving movable body 71 and the boss 190, are greater than in the preceding form of embodiment.

The distributor according to this invention may be utilized in all cases wherein a liquid is to be dispensed alternatively through a first conduit and then through a second conduit, but only when a predetermined volume of liquid has passed through the first conduit, irrespective of the pressure existing in the liquid supply circuit. A particularly advantageous application of this distributor is in watering or sprinkling systems, notably of the automatic type.

What is claimed is:

1. A distributor for controlling the dispensing of a liquid, notably for sprinkling systems and the like, of the type comprising an inlet orifice and two outlet orifices, a spring-loaded valve closing the second outlet orifice in the inoperative condition while leaving the first outlet orifice open, a volumetric metering device adapted to actuate said valve against its spring-loading for closing said first outlet orifice and simultaneously opening said second outlet orifice when a predetermined quantity of liquid has passed through said first outlet orifice, said volumetric metering device comprising a cylinder and a piston slidably fitted in said cylinder, said piston defining with its first face and the bottom of said cylinder a chamber connected via a passage to said inlet orifice and supporting with its opposite face a rod so disposed that said valve lies in the path of its axial movement, resilient means constantly urging said piston towards the bottom of said cylinder, wherein said volumetric metering device further comprises a turbine inserted in the liquid circuit between said inlet orifice and said first outlet orifice, a driving member kinematically connected to said turbine via a speed reducer, said driving member comprising shaped portions adapted to co-act with matching shaped portions provided on a control member adapted to perform on the one hand a sliding movement along a first path in which said control member lies in the path of a push member supported by said piston rod and on the other hand another movement along a second path disposed in a plane at right angles with respect to said first path when said shaped portions of said control member are in meshing engagement with those of said driving member, the shaped portions of said control and driving members being in mutual meshing engagement when said control member responsive to said push member has accomplished a predetermined sliding movement along its first path, said control member having a clearance with dimensions at least sufficient to permit the passage of said push member; said clearance registering with said push member after said control member responsive to said driving member has accomplished a predetermined movement along its second path, against the force of resilient means constantly urging said control member against a fixed stop to its inoperative position.

2. A distributor according to claim 1, wherein said driving member consists of a movable body rotatably mounted and having its shaped portions disposed concentrically to the axis of said body, said control member consisting of a movable body mounted for sliding and rotary motion along and about an axis coincident with its first path, said movable control body having its shaped portions disposed concentrically to said last-mentioned axis, the clearance provided for permitting the passage of said push member being limited angularly, and the movement of said movable control body along its second path, which is a circular path, is restricted to less than one revolution.

3. A distributor according to claim 2, wherein said driving movably body and said control movable body are both pivoted concentrically to each other about a common axis consisting of the piston-supported rod, the shaped portions of the two movable bodies being formed on registering peripheral faces, respectively, of said bodies, the clearance formed in said control movable body opening radially into the orifice provided for receiving said piston rod, the movement of said push-member being limited angularly about said rod.

4. A distributor according to claim 3, wherein a second valve adapted to close the passage interconnecting said inlet orifice and said cylinder chamber as a consequence of the sliding movement of the control member along its first path is provided, resilient means being disposed between said second valve and said control member, said movable driving body being slidably mounted on its axis, one portion of this movable driving body being interposed between said movable control member and the resilient means co-acting with said second valve.

5. A distributor according to claim 4, wherein a lever is disposed as an intermediate member between the resilient means co-acting with said second valve and the movable driving body.

6. A distributor according to claim 3, comprising means for adjusting the volume of liquid to be allowed to flow through said first outlet orifice before closing said first orifice, wherein said adjustment means consist of a device permitting the angular displacement through one fraction of a revolution, at will, of said piston-supported rod and of the push member rigid therewith.

7. A distributor according to claim 2, wherein said control movable body is pivoted about an axis separate from the axis of said driving movable body, said axis consisting of said piston-supported rod, the shaped portions of the two movable bodies being formed on the outer peripheries of said bodies, respectively, resilient means constantly urging said bodies to their disconnected relative condition, the clearance formed in said control body opening radially into the orifice provided for receiving said rod, the movement of said push member being limited angularly about said rod.

8. A distributor according to claim 7, comprising means for adjusting the volume of liquid to be allowed to flow through said first outlet orifice before closing said first orifice, wherein said adjustment means consist of a device permitting the angular displacement through one fraction of a revolution, at will, of said piston-supported rod and of the push member rigid therewith.

9. A distributor according to claim 2, wherein the axis of said movable control body, the axis of said movable driving body and the axis of said piston-supported rod, are separate from one another, the shaped portions of the two bodies being formed on the outer peripheries of said bodies, respectively, resilient means constantly urging said bodies in their disconnected relative condition, said clearance formed in said control body opening radially into the outer periphery of said control body.

10. A distributor according to claim 2, wherein said driving and control movable bodies are pivoted concentrically to each other about a common axis separate from the axis of the pistons-supported rod, the shaped portions of said bodies being formed on registering faces, respectively, of said bodies, said clearance formed in said control body opening radially into the outer periphery of said control body.

11. A distributor according to claim 10, wherein a second valve adapted to close the passage interconnecting said inlet orifice and said cylinder chamber as a consequence of the sliding movement of the control member along its first path is provided, resilient means being disposed between said second valve and said control member, said movable driving body being slidably mounted on its axis, one portion of this movable driving body being interposed between said movable control member and the resilient means co-acting with said second valve.

12. A distributor according to claim 2, comprising means for adjusting the volume of liquid to be allowed to flow through said first outlet orifice before closing said first orifice, wherein said adjustment means consist of a device permitting the angular displacement through one fraction of a revolution, at will, of said piston-supported rod and of the push member rigid therewith.

13. A distributor according to claim 1, wherein said driving member consists of a movable driving body rotatably mounted and having its shaped portions disposed concentrically to the axis of said body, the control member being adapted to slide along its second path and having its shaped portions parallel to said second path, the clearance provided for permitting the passage of said push member being restricted in the longitudinal direction.

14. A distributor according to claim 13, wherein said control member is slidably movable along one of its two paths on a relief guide means co-acting with hollow guide means of conjugate cross-sectional contour formed in said control member, and along its other path in a hollow guide means having a cross-section matching an outer contour of said control member and disposed across said relief guide means, the dimension of the hollow guide means provided in said control member being sufficient, in the direction of said other path, for permitting the movement of said control member along said other path against the force of resilient means.

15. A distributor according to claim 14, wherein a second valve adapted to close the passage interconnecting said cylinder chamber and said inlet orifice as a consequence of the sliding movement of the control member along its first path is provided, resilient means being disposed between said second valve and said control member.

16. A distributor according to claim 15, wherein the resilient means disposed between the second valve and the control member, is unstressed in its inoperative condition.

17. A distributor according to claim 1, wherein a second valve adapted to close the passage interconnecting said cylinder chamber and said inlet orifice as a consequence of the sliding movement of the control member along its first path is provided, resilient means being disposed between said second valve and said control member.

18. A distributor according to claim 17, wherein the resilient means disposed between the second valve and the control member, is unstressed in its inoperative condition.

19. A distributor according to claim 17, wherein a lever is disposed as an intermediate member between the resilient means co-acting with said second valve and the control member.

20. A distributor according to claim 19, wherein said intermediate lever consists of a spring blade also acting as a resilient means co-acting with said second valve.

21. A distributor according to claim 1, wherein a device permitting the angular displacement of said piston-supported rod comprises an actuator lever of which at least one portion is disposed at least partially across said rod, one end of said one portion constituting a sleeve surrounding said rod and comprising a longitudinal inner groove slidably engaged by one relief portion rigid with said rod.

22. A distributor according to claim 21, wherein means for locking said actuator lever are provided, said locking means comprising the resilient means constantly counteracting the sliding movement of said piston, said resilient means reacting with one end against the sleeve of said actuator lever.

23. A distributor for controlling the dispensing of a liquid, notably for sprinkling systems and the like, of the type comprising an inlet orifice and two outlet orifices, a spring-loaded valve closing the second outlet orifice in the inoperative condition while leaving the first outlet orifice open, a volumetric metering device adapted to actuate said valve against its spring-loading for closing said first outlet orifice and simultaneously opening said second outlet orifice when a predetermined quantity of liquid has passed through said first outlet orifice, said volumetric metering device comprising a cylinder and a piston slidably fitted in said cylinder, said piston defining with its first face and the bottom of said cylinder a chamber connected via a passage to said inlet orifice and supporting with its opposite face a rod so disposed that said valve lies in the path of its axial movement, resilient means constantly urging said piston toward the bottom of said cylinder, whereby fluid entering said chamber from said inlet acts to move said piston and rod in a direction to move said valve to a position opening said second outlet orifice and closing said first outlet orifice, said volumetric metering device further comprising control means for blocking said movement of said piston and rod, a turbine inserted in the liquid circuit between said inlet orifice said first outlet orifice and driving means including speed reducing means kinematically connecting said turbine with said control means to actuate said control means, after a selected flow of liquid through said turbine, to release said piston and rod, whereupon said piston moves said rod to move said valve to a position opening said second outlet orifice and closing said first outlet orifice.

24. A distributor according to claim 23, wherein second valve means in said passage connecting said chamber with said inlet orifice is operable to close said passage and is controlled by said control means to open said passage when said piston and rod are released by said control means.

* * * * *